US012799281B2

(12) United States Patent
Suzuki et al.

(10) Patent No.: US 12,799,281 B2
(45) Date of Patent: Nov. 17, 2026

(54) ORGANOPOLYSILOXANE HAVING PERFLUOROPOLYETHER BLOCK AND (METH)ACRYLOYL GROUP, AND PRODUCTION METHOD THEREFOR

(71) Applicant: Shin-Etsu Chemical Co., Ltd., Tokyo (JP)

(72) Inventors: Takayuki Suzuki, Annaka (JP); Tomoyuki Goto, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 445 days.

(21) Appl. No.: 18/699,808

(22) PCT Filed: Sep. 21, 2022

(86) PCT No.: PCT/JP2022/035165
§ 371 (c)(1),
(2) Date: Apr. 9, 2024

(87) PCT Pub. No.: WO2023/063037
PCT Pub. Date: Apr. 20, 2023

(65) Prior Publication Data

US 2024/0417517 A1 Dec. 19, 2024

(30) Foreign Application Priority Data

Oct. 15, 2021 (JP) ................................ 2021-169209

(51) Int. Cl.
*C08G 77/46* (2006.01)
*C08G 65/00* (2006.01)
*C08G 65/336* (2006.01)

(52) U.S. Cl.
CPC .......... *C08G 77/46* (2013.01); *C08G 65/007* (2013.01); *C08G 65/336* (2013.01)

(58) Field of Classification Search
None
See application file for complete search history.

(56) References Cited

U.S. PATENT DOCUMENTS

| | | | | |
|---|---|---|---|---|
| 2005/0218536 | A1 | 10/2005 | Quinn et al. | |
| 2006/0004165 | A1 | 1/2006 | Phelan et al. | |
| 2006/0264596 | A1 | 11/2006 | Yamaguchi et al. | |
| 2007/0037898 | A1 | 2/2007 | Phelan et al. | |
| 2007/0132949 | A1 | 6/2007 | Phelan | |
| 2008/0071042 | A1* | 3/2008 | Yamane .............. | C08G 65/007 525/474 |
| 2010/0147191 | A1* | 6/2010 | Sakano ................ | C09D 175/16 556/419 |
| 2011/0015420 | A1 | 1/2011 | Yamaguchi et al. | |
| 2015/0315213 | A1 | 11/2015 | Chang et al. | |
| 2017/0160565 | A1 | 6/2017 | Muya et al. | |

FOREIGN PATENT DOCUMENTS

| | | | | |
|---|---|---|---|---|
| JP | 4-149235 | A | 5/1992 | |
| JP | 4-180927 | A | 6/1992 | |
| JP | 4-180928 | A | 6/1992 | |
| JP | 11-349651 | A | 12/1999 | |
| JP | 2006-321764 | A | 11/2006 | |
| JP | 2007-531905 | A | 11/2007 | |
| JP | 2008-504419 | A | 2/2008 | |
| JP | 2008-88412 | A | 4/2008 | |
| JP | 2009/504820 | A | 2/2009 | |
| JP | 2009-519477 | A | 5/2009 | |
| JP | 2010-138112 | A | 6/2010 | |
| JP | 2011-21158 | A | 2/2011 | |
| JP | 2011-241190 | A | 12/2011 | |
| JP | 4900854 | B2 | 3/2012 | |
| JP | 2013-199558 | A | 10/2013 | |
| JP | 2015-199910 | A | 11/2015 | |
| JP | 2016-501948 | A | 1/2016 | |
| JP | 2019-507908 | A | 3/2019 | |
| JP | 2020-16896 | A | 1/2020 | |
| WO | WO-2021044639 | A1 * | 3/2021 | .......... C09D 183/12 |

OTHER PUBLICATIONS

International Search Report for PCT/JP2022/035165 (PCT/ISA/210) mailed on Oct. 25, 2022.

* cited by examiner

*Primary Examiner* — Eli D. Strah
(74) *Attorney, Agent, or Firm* — Birch, Stewart, Kolasch & Birch, LLP

(57) ABSTRACT

Provided is an organopolysiloxane containing a perfluoropolyether block and a (meth)acryloyl group, wherein the organopolysiloxane has a perfluoropolyether group and is excellent in affinity with nonfluorinated organic compounds, and the organopolysiloxane further has a (meth)acryloyl group which allows a reaction with a radically polymerizable compound, the organopolysiloxane allowing the number of organosiloxy units and the number of siloxane units having a (meth)acryloyl group to be easily controlled, and a method of producing the same. This organopolysiloxane has a perfluoropolyether block and a (meth)acryloyl group. The method for producing an organopolysiloxane having a perfluoropolyether block and a (meth)acryloyl group, includes the steps of: mixing the components of (a) a perfluoropolyether-organopolysiloxane block copolymer and (b) a polysiloxane having a (meth)acryloyl group; and performing an exchange reaction between the siloxanes of the components (a) and (b) under the presence of (c) an acid catalyst.

9 Claims, No Drawings

ORGANOPOLYSILOXANE HAVING PERFLUOROPOLYETHER BLOCK AND (METH)ACRYLOYL GROUP, AND PRODUCTION METHOD THEREFOR

TECHNICAL FIELD

The present invention relates to a reactive organopolysiloxane for allowing compatibility or physical properties of a cured product to be easily controlled, the reactive organopolysiloxane contains a perfluoropolyether block, and further has organopolysiloxane blocks at both ends of the molecular chain, and the organopolysiloxane further has a (meth) acryloyl group at its sidechain moiety of the organopolysiloxane; and to a method for producing the same.

BACKGROUND ART

In general, since a perfluoropolyether group-containing compound has extremely low surface free energy, it possesses, for example, chemical resistance, lubricity, mold releasability, and water- and oil-repellent properties. Taking advantage of such properties, such compounds are industrially and widely used as lubricants for magnetic recording media; oil-proof agents for precision apparatuses; mold release agents; water- and oil-repellent antifoulants for, for example, paper, fiber, glass and resin; cosmetic materials; and protective films.

However, the perfluoropolyether group-containing compound exhibits extremely low compatibility and affinity to other substances because it has a low surface free energy. Problems in dispersion stability and reactivity will occur if adding a perfluoropolyether group-containing compound to various industrial materials or the like for the purpose of imparting the above properties. It has thus been difficult to add a perfluoropolyether group-containing compound to various industrial materials or the like. In view of this, there is proposed a urethane methacrylate comprised of a reaction product of a perfluoropolyether group-containing diol and 2-isocyanate ethyl methacrylate (Patent document 1).

Meanwhile, as a polysiloxane compound also has a low surface free energy, it possesses properties such as a water-repellent property, a lubricity and a mold releasability. Nevertheless, a polysiloxane compound has a favorable affinity for other substances as compared to a perfluoropolyether compound, and is also capable of improving dispersion stability if modified suitably. Thus, a polysiloxane compound can easily impart properties of a silicone when added to various industrial materials or the like; polysiloxane compounds are used as additives for performance upgrade in a wide range of fields. As a perfluoropolyether group- and polysiloxane chain-containing compound, there are perfluoropolyether-modified polysiloxane compounds (Patent document 2).

However, when the fluorine modification rate in a polysiloxane compound is raised for the purpose of improving the property of the perfluoropolyether group, an affinity for other industrial materials will be significantly impaired, and problems in dispersion stability, reactivity and/or others may occur.

In this regard, there have been made available perfluoropolyether-organopolysiloxane block copolymers having the properties of both a perfluoropolyether and a polysiloxane, and having an excellent affinity for nonfluorinated organic compounds (Patent documents 3 and 4).

Further, there has also been made available a perfluoropolyether-organopolysiloxane block copolymer having a (meth)acryloyl group in a siloxane block, which can impart, for example, a water- and oil-repellent property by compounding it in a radically curable composition (Patent document 5). However, it allows only a limited number of siloxane units or polymerizable groups to be introduced therein, and it is difficult to control compatibility with the curable composition and mechanical properties of the cured product to be obtained.

PRIOR ART DOCUMENTS

Patent Documents

Patent document 1: JP-A-H11-349651
Patent document 2: JP-A-2006-321764
Patent document 3: JP-A-2008-88412
Patent document 4: JP-A-2011-21158
Patent document 5: JP-A-2011-241190

SUMMARY OF THE INVENTION

Problems to be Solved by the Invention

The perfluoropolyether-organopolysiloxane block copolymers disclosed in Patent documents 3 and 4 undoubtedly have a favorable affinity for nonfluorinated organic compounds; however, since they do not have a radically polymerizable group, these copolymers cannot react with a radically polymerizable compound, which therefore makes it impossible to impart, for example, a long-lasting water- and oil-repellent property even when they are compounded in a radically curable composition.

Meanwhile, the urethane methacrylate comprised of a reaction product of a perfluoropolyether group-containing diol and 2-isocyanate ethyl methacrylate as disclosed in Patent document 1 does not have a polysiloxane, and has a low affinity for nonfluorinated organic compounds due to the water- and oil-repellent property of the perfluoropolyether group, which therefore narrows its intended applications and the components that can be compounded therein.

Further, the perfluoropolyether-organopolysiloxane block copolymer having a radically polymerizable group as disclosed in Patent document 5 undoubtedly has a favorable compatibility with nonfluorinated organic compounds; however, it allows only a limited number of organosiloxy units or (meth) acryloyl groups to be introduced therein, and it is thus difficult to control compatibility to the curable composition and/or to control the mechanical properties of the cured product to be obtained.

Thus, it is an object of the present invention to provide an organopolysiloxane having a perfluoropolyether block and a (meth)acryloyl group in which the organopolysiloxane has a perfluoropolyether group and exhibits an excellent affinity for nonfluorinated organic compounds, and organopolysiloxane has a (meth)acryloyl group reactive with radical-polymerizable groups with which the number of organosiloxy units and the number of siloxane units having (meth) acryloyl groups can be easily controlled; and a method for producing the organopolysiloxane.

Means to Solve the Problems

The inventors of the present invention diligently conducted a series of studies for solving the above problems, and have found that the organopolysiloxane having a perfluoropolyether block and a (meth)acryloyl group and a method for producing the same which are as set forth in the following can achieve the above-mentioned object, and therefore completed the invention. That is, the present invention provides:

[1] An organopolysiloxane comprising a perfluoropolyether block and a (meth)acryloyl group, said organopolysiloxane being represented by the following formula (1)

[Chemical formula 1]

$$W2—Q—Rf—Q—(W1—Q—Rf—Q)_g—W2 \quad (1)$$

wherein in the formula (1), Rf is a perfluoropolyether block represented by a formula (2) as defined below, W1 is a divalent organopolysiloxane block represented by a formula (A) as defined below, each W2 independently represents a monovalent organopolysiloxane block represented by a formula (B) as defined below, Q is a divalent organic group having 2 to 12 carbon atoms and g is a number of not smaller than 0, wherein the formula (2) is expressed as

[Chemical formula 2]

$$C_zF_{2z}(OCF_2)_v(OC_2F_4)_w(OC_3F_6)_x(OC_4F_8)_yOC_zF_{2z}— \quad (2)$$

wherein in the formula (2), z is a number of 1 to 4; v, w, x and y each independently represents a number of 0 to 200 where v+w+x+y=3 to 200, each repeating unit may be linear or branched, there are no restrictions on an arrangement order of each repeating unit, and the arrangement order may be random or block, wherein the formula (A) is expressed as

[Chemical formula 3]

(A)

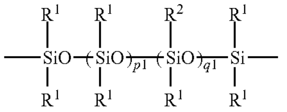

wherein in the formula (A), $R^1$ independently represents a group selected from an alkyl group having 1 to 18 carbon atoms, an aryl group having 6 to 18 carbon atoms and an aralkyl group having 7 to 18 carbon atoms, $R^2$ is a monovalent group having a (meth)acryloyl group, p1 and q1 each represents a number of 0 to 1,000, there are no restrictions on an arrangement order of each repeating unit, and the arrangement order may be random or block, and wherein the formula (B) is expressed as

[Chemical formula 4]

(B)

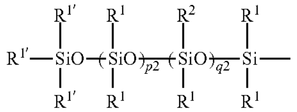

wherein in the formula (B), $R^1$ independently represents a group selected from an alkyl group having 1 to 18 carbon atoms, an aryl group having 6 to 18 carbon atoms and an aralkyl group having 7 to 18 carbon atoms, $R^2$ is a monovalent group having a (meth)acryloyl group, $R^{1'}$ independently represents a group selected from an alkyl group having 1 to 18 carbon atoms, an aryl group having 6 to 18 carbon atoms and an aralkyl group having 7 to 18 carbon atoms, p2 and q2 each represents a number of 0 to 1,000, there are no restrictions on an arrangement order of each repeating unit, and the arrangement order may be random or block, and wherein the number q1 of the siloxane units having a (meth)acryloyl group in the formula (A) and the number q2 of the siloxane units having a (meth) acryloyl group in the formula (B) shall not both be 0 at the same time; and Q in the formula (1) is bonded to any of the terminal carbon atom of Rf, the terminal silicon atom of W1, or the terminal silicon atom of W2.

[2] The organopolysiloxane comprising a perfluoropolyether block and a (meth)acryloyl group according to [1], wherein the organopolysiloxane has a number average molecular weight of 3,000 to 500,000, and an organopolysiloxane block content of not smaller than 50% per molecule.

[3] The organopolysiloxane comprising a perfluoropolyether block and a (meth)acryloyl group according to [1] or [2], wherein the monovalent group represented by $R^2$ having a (meth)acryloyl group is a group expressed by the following formula (3)

[Chemical formula 5]

(3)

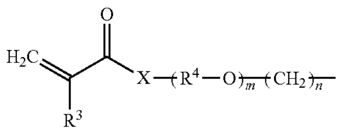

wherein in the formula (3), $R^3$ is a hydrogen atom or a methyl group, X is an oxygen atom or a group represented by —NH—, $R^4$ is an alkylene group having 2 to 4 carbon atoms, m is a number of 0 to 60, and n is a number of 3 to 8.

[4] The organopolysiloxane comprising a perfluoropolyether block and a (meth)acryloyl group according to any one of [1] to [3], wherein the perfluoropolyether block represented by Rf is a group expressed by the following formula (4)

[Chemical formula 6]

$$CF_2(OCF_2)_v(OC_2F_4)_wOCF_2— \quad (4)$$

wherein in the formula (4), v and w each represent a number of 0 to 200, provided that v+w=3 to 200; the repeating unit of $(OC_2F_4)$ may be linear or branched, there are no restrictions on an arrangement order of each repeating unit, and the arrangement order may be random or block.

[5] A method for producing an organopolysiloxane, represented by a formula (1) as defined below, having a perfluoropolyether block and a (meth)acryloyl group, comprising the steps of:

mixing the components of (a) a perfluoropolyether-organopolysiloxane block copolymer represented by a formula (5) as defined below and (b) a polysiloxane having a (meth)acryloyl group; and performing an exchange reaction between the siloxanes of the components (a) and (b) under the presence of (c) an acid catalyst, wherein the formula (1) is expressed as

[Chemical formula 7]

$$W2—Q—Rf—Q—(W1—Q—Rf—Q)_g—W2 \quad (1)$$

wherein in the formula (1), Rf is a perfluoropolyether block represented by a formula (2) as defined below, W1 independently represents a divalent organopolysiloxane block represented by a formula (A) as defined below, each W2 independently represents a monovalent organopolysiloxane block represented by a formula (B) as defined below, Q is as defined above and g is a number of not smaller than 0, wherein the formula (2) is expressed as

[Chemical formula 8]

$$C_zF_{2z}(OCF_2)_v(OC_2F_4)_w(OC_3F_6)_x(OC_4F_8)_yOC_zF_{2z}— \quad (2)$$

wherein in the formula (2), z is a number of 1 to 4, v, w, x and y each independently represents a number of 0 to 200 where v+w+x+y=3 to 200, each repeating unit may be linear or branched, there are no restrictions on an arrangement order of each repeating unit, and the arrangement order may be random or block, wherein the formula (A) is expressed as

[Chemical formula 9]

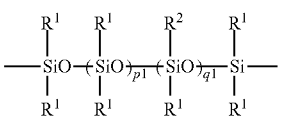

(A)

wherein in the formula (A), $R^1$ independently represents a group selected from an alkyl group having 1 to 18 carbon atoms, an aryl group having 6 to 18 carbon atoms and an aralkyl group having 7 to 18 carbon atoms, $R^2$ independently represents a monovalent group having a (meth)acryloyl group, p1 and q1 each represents a number of 0 to 1,000, there are no restrictions on an arrangement order of each repeating unit, and the arrangement order may be random or block, and wherein the formula (B) is expressed as

[Chemical formula 10]

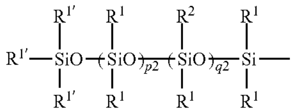

(B)

wherein in the formula (B), $R^1$ independently represents a group selected from an alkyl group having 1 to 18 carbon atoms, an aryl group having 6 to 18 carbon atoms and an aralkyl group having 7 to 18 carbon atoms, $R^2$ is a monovalent group having a (meth)acryloyl group, $R^{1'}$ independently represents a group selected from an alkyl group having 1 to 18 carbon atoms, an aryl group having 6 to 18 carbon atoms and an aralkyl group having 7 to 18 carbon atoms, p2 and q2 each represents a number of 0 to 1,000, there are no restrictions on an arrangement order of each repeating unit, and the arrangement order may be random or block, and wherein the number q1 of the siloxane units having a (meth)acryloyl group in the formula (A) and the number q2 of the siloxane units having a (meth) acryloyl group in the formula (B) shall not both be 0 at the same time, and Q in the formula (1) is bonded to any of the terminal carbon atom of Rf, the terminal silicon atom of W1, or the terminal silicon atom of W2; and

[Chemical formula 11]

$$W4—Q—Rf—Q—(W3—Q—Rf—Q)_{g'}—W4 \quad (5)$$

wherein in the formula (5), Rf is a perfluoropolyether block represented by the formula (2), each W3 independently represents a divalent organopolysiloxane block represented by a formula (A') as defined below, each W4 independently represents a monovalent organopolysiloxane block represented by a formula (B') as defined below, Q is as defined above and g' is a number of not smaller than 0 wherein the formula (A') is expressed as

[Chemical formula 12]

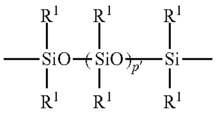

(A')

wherein in the formula (A'), each $R^1$ is as defined above, p' represents a number of 0 to 1,000, and the formula (B') being expressed as

[Chemical formula 13]

(B')

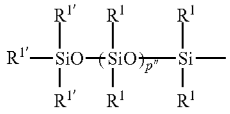

wherein in the formula (B'), $R^1$ and $R^{1'}$ are as defined above, and p" is a number of 0 to 1,000, and wherein Q in the formula (5) is bonded to any of the terminal carbon atom of Rf, the terminal silicon atom of W3, or the terminal silicon atom of W4.

[6] The method for producing an organopolysiloxane having a perfluoropolyether block and a (meth)acryloyl group according to [5], wherein the component (b) comprises at least one kind of polysiloxane having a (meth)acryloyl group represented by the following formula (6) or (7) expressed as:

[Chemical formula 14]

(6)

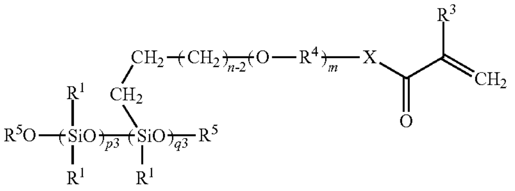

wherein in the formula (6), $R^1$ independently represents a group selected from an alkyl group having 1 to 18 carbon atoms, an aryl group having 6 to 18 carbon atoms and an aralkyl group having 7 to 18 carbon atoms, $R^5$ independently represents a hydrogen atom, an alkyl group having 1 to 4 carbon atoms or $—SiR^1_3$ (each $R^1$ is as defined above), $R^3$ is a hydrogen atom or a methyl group, X is an oxygen atom or a group represented by —NH—, $R^4$ is an alkylene group having 2 to 4 carbon atoms, m is a number of 0 to 60, n is a number of 3 to 8, p3 is a number of 0 to 1,000, and q3 is a number of 1 to 100; and

[Chemical formula 15]

(7)

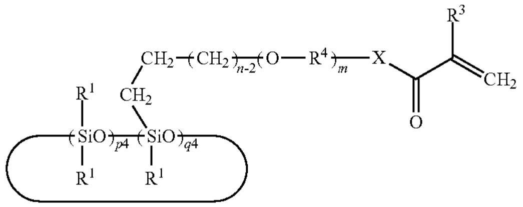

wherein in the formula (7), $R^1$, $R^3$, $R^4$, X, m and n are as defined above, p4 is a number of 0 to 6, and q4 is a number of 1 to 8 provided that they satisfy $3 \leq p4+q4 \leq 14$.

[7] The method for producing an organopolysiloxane having a perfluoropolyether block and a (meth)acryloyl group according to [5] or [6], further comprising a step of adding a component (d) which comprises at least one kind selected from the polysiloxanes represented by formulae (8) and (9) expressed as:

[Chemical formula 16]

(8)

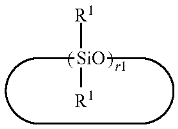

wherein in the formula (8), $R^1$ independently represents a group selected from an alkyl group having 1 to 18 carbon atoms, an aryl group having 6 to 18 carbon atoms and an aralkyl group having 7 to 18 carbon atoms, and r1 is a number of 3 to 10; and

[Chemical formula 17]

(9)

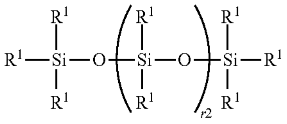

wherein in the formula (9), each $R^1$ is as defined above, and r2 is a number of 0 to 5,000.

[8] The method for producing an organopolysiloxane having a perfluoropolyether block and a (meth)acryloyl group according to any one of [5] to [7], wherein the component (c) as being the acid catalyst comprises at least one kind selected from sulfuric acid, methanesulfonic acid and trifluoromethanesulfonic acid.

[9] The method for producing an organopolysiloxane having a perfluoropolyether block and a (meth)acryloyl group according to any one of [5] to [8], wherein the step of performing an exchange reaction between the siloxanes of the components (a) and (b) is carried out under the presence of a component (e) as being an organic solvent.

Effects of the Invention

The organopolysiloxane of the present invention has a perfluoropolyether block and contains an organopolysiloxane block at both ends of the molecular chain. Since the organopolysiloxane has a high content of organopolysiloxane block, the organopolysiloxane is readily compatible with nonfluorinated organic compounds. Further, since the organopolysiloxane contains a (meth)acryloyl group, it allows a reaction with a radically polymerizable compound, and an inhomogeneous and/or white turbid parts are less likely to occur in the obtained cured product. Further, since the organopolysiloxane of the present invention allows the number of organosiloxy units and the number of siloxane units having a (meth)acryloyl group to be easily controlled, compatibility to the curable composition and/or mechanical properties of a cured product to be obtained can also be easily controlled. Accordingly, the organopolysiloxane of the present invention is useful for applications such as a surface modifier for nonfluorinated organic resins.

MODE FOR CARRYING OUT THE INVENTION

The present invention will be described in more detail below.

The organopolysiloxane of the present invention is represented by the following formula (1), wherein a perfluoropolyether block (Rf) and an organopolysiloxane block (W2 or W1) are alternately positioned.

[Chemical formula 18]

$$W2—Q—Rf—Q\left(W1—Q—Rf—Q\right)_g W2 \qquad (1)$$

Since W2 and/or W1 have a (meth)acryloyl group, the organopolysiloxane of the present invention represented by the formula (1) can be reacted with a radically polymerizable compound.

It is preferred that the organopolysiloxane of the formula (1) contain, per molecule, 50 to 99%, more preferably 60 to 90% of organopolysiloxane block. The organopolysiloxane block content of not less than the lower limit, as indicated above, is excellent in compatibility to nonfluorinated organic compounds, while the organopolysiloxane block content of not more than the upper limit, as indicated above, makes the properties of the perfluoropolyether groups to be easily expressed. In the $^1$H-NMR spectroscopy of the organopolysiloxane of the formula (1), the value of the organopolysiloxane block content is a value calculated in such a manner that a molar ratio between the perfluoropolyether blocks Rf with known molecular weights and organosiloxy units is at first obtained from an integrated ratio between a peak derived from alkylene of Q in the formula (1) and a peak derived from an organic group bonded to the silicon atom in W2 and W1, and this molar ratio is then converted into a molecular weight ratio. Here, since the organopolysiloxane of the formula (1) normally has a distribution in its structure, the organopolysiloxane block content is an average value per molecule.

At least one of the organopolysiloxane blocks W1 and W2 has a siloxane unit, having a (meth)acryloyl group, represented by the following formula (10).

[Chemical formula 19]

(10)

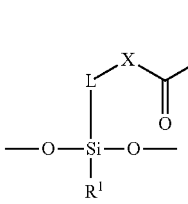

In the formula (10), $R^1$ represents a group selected from an alkyl group having 1 to 18 carbon atoms, an aryl group having 6 to 18 carbon atoms and an aralkyl group having 7 to 18 carbon atoms, of which preferred is a methyl group or a phenyl group. L is a divalent linking group having 1 to 150 carbon atoms optionally containing at least one selected from oxygen atom and nitrogen atom, and it is preferred that L be a divalent linking group having 2 to 5 carbon atoms optionally containing an oxygen atom. X is an oxygen atom or a group represented by —NH—, preferably is an oxygen atom. $R^3$ is a hydrogen atom or a methyl group.

The formula (1) has at least one siloxane unit having a (meth)acryloyl group, and it is preferred in terms of reactivity that the formula has at least three siloxane units. The siloxane unit of the formula (10) in the organopolysiloxane block W1 and the siloxane unit of the formula (10) in the organopolysiloxane block W2 may be different from each other.

In the above formula (1), the organopolysiloxane block W1 is a divalent group represented by the following general formula (A).

[Chemical formula 20]

(A)

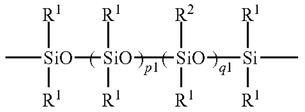

In the formula (A), $R^1$ independently represents a group selected from an alkyl group having 1 to 18 carbon atoms, an aryl group having 6 to 18 carbon atoms and an aralkyl group having 7 to 18 carbon atoms, of which preferred is a methyl group or a phenyl group. $R^2$ independently represents a monovalent group having a (meth)acryloyl group, and preferably is a group represented by the following formula (3).

[Chemical formula 21]

(3)

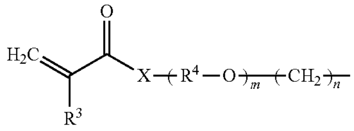

In the formula (3), $R^3$ is a hydrogen atom or a methyl group. X is an oxygen atom or a group represented by —NH—, and is preferably an oxygen atom. $R^4$ is an alkylene group having 2 to 4 carbon atoms, and preferably is an alkylene group having 2 or 3 carbon atoms. m is a number of 0 to 60, preferably of 0 to 12, and n is a number of 3 to 8, preferably of 3 to 4.

p1 and q1 each represents a number of 0 to 1,000, preferably of 0 to 500, and more preferably of 0 to 200. The arrangement order of each repeating unit is not limited and may be random or block.

Examples of the group represented by the formula (A) include, for example, the groups represented by the following formulae (11) to (14). However, the group represented by the formula (A) is not limited to the following formulae.

[Chemical formula 22]

(11)

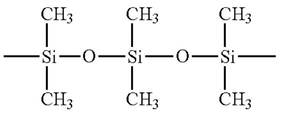

-continued (12)

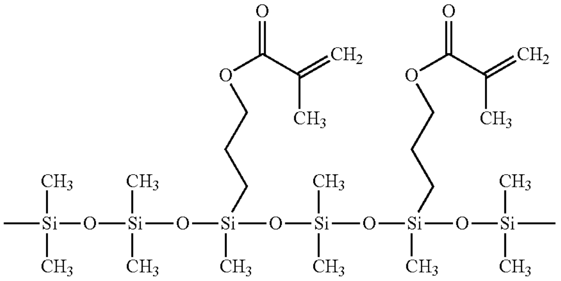

(13)

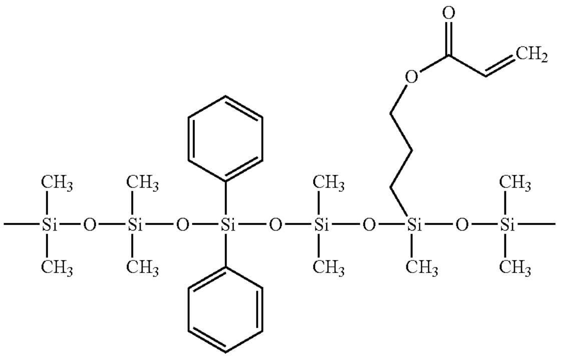

(14)

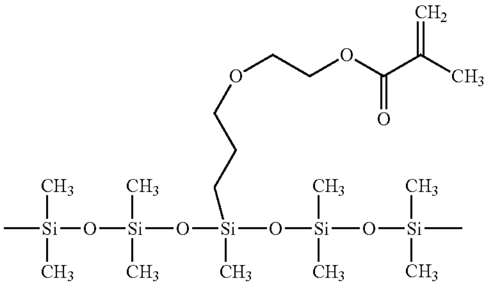

In the formula (1), each organopolysiloxane block W2 represents a monovalent group represented by the following general formula (B).

[Chemical formula 23]

(B)

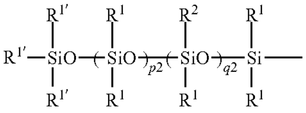

In the formula (B), $R^1$ independently represents a group selected from an alkyl group having 1 to 18 carbon atoms, an aryl group having 6 to 18 carbon atoms and an aralkyl group having 7 to 18 carbon atoms. $R^2$ is a monovalent group having a (meth)acryloyl group. $R^{1'}$ independently represents a group selected from an alkyl group having 1 to 18 carbon atoms, an aryl group having 6 to 18 carbon atoms and an aralkyl group having 7 to 18 carbon atoms. It is preferred that $R^{1'}$ be an alkyl group having 1 to 18 carbon atoms or an aralkyl group having 7 to 18 carbon atoms, more preferably be, for example, an alkyl group of a methyl group, an ethyl group, a propyl group, a butyl group, a hexyl group or an octyl group, or an aralkyl group of a benzyl group, a 2-phenylethyl group or a 2-phenylpropyl group. p2 and q2 each represents a number of 0 to 1,000, preferably of 0 to 500, more preferably of 0 to 200.

The arrangement order of each repeating unit is not limited and may be random or block. However, the number q1 of the siloxane units having a (meth)acryloyl group in the formula (A) and the number q2 of the siloxane units having a (meth)acryloyl group in the formula (B) shall not both be 0 at the same time.

Examples of the group represented by the formula (B) include, for example, the groups represented by the following formulae (15) to (18). However, the group represented by the formula (B) is not limited to the following formulae.

[Chemical formula 24]

(15)

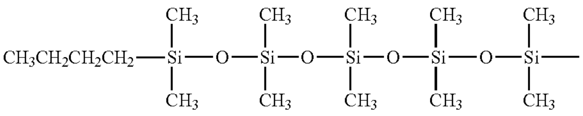

(16)

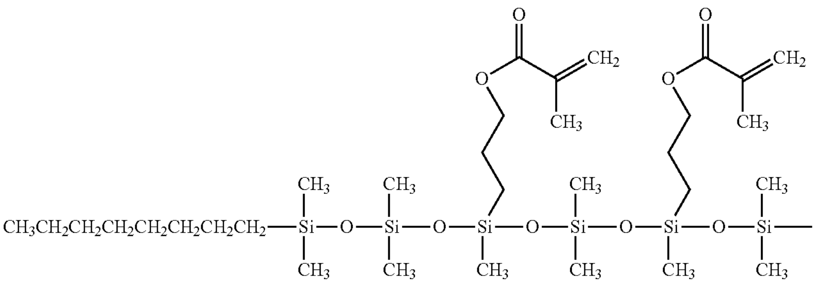

-continued (17)

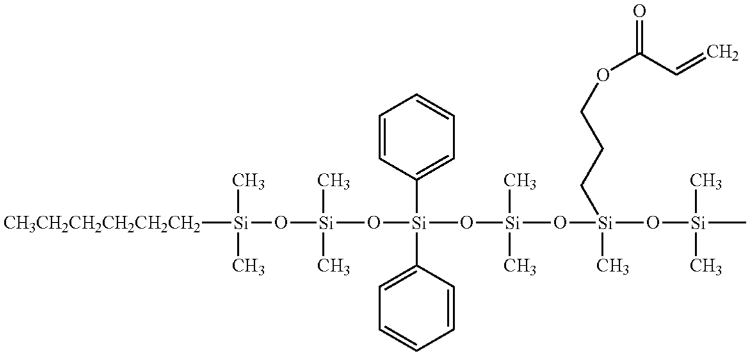

(18)

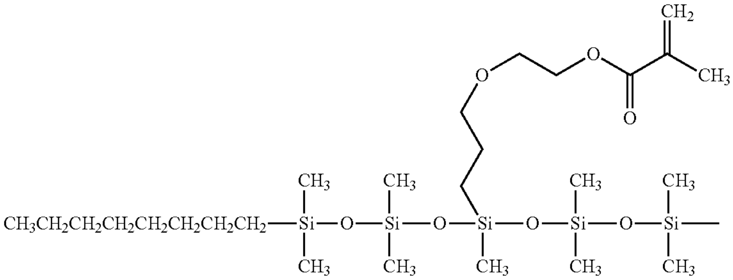

The perfluoropolyether blocks Rf in the formula (1) are each represented by the following general formula (2).

[Chemical formula 25]

$$C_zF_{2z}(OCF_2)_v(OC_2F_4)_w(OC_3F_6)_x(OC_4F_8)_yOC_zF_{2z}— \quad (2)$$

In the formula (2), z is a number of 1 to 4, v, w, x and y each independently represents a number of 0 to 200, preferably of 0 to 50, provided that v+w+x+y=3 to 200, preferably 10 to 50; each repeating unit may be linear or branched, there are no restrictions on an arrangement order of each repeating unit, and the arrangement order may be random or block.

Examples of each repeating unit of the perfluoropolyether blocks Rf represented by the formula (2) include, for example, the repeating units as shown below.

$—CF_2O—$ $—CF_2CF_2O—$ $—CF_2CF_2CF_2O—$ $—CF(CF_3)CF_2O—$ $—CF_2CF_2CF_2CF_2O—$ $—C(CF_3)_2O—$ [Chemical formula 26]

In the formula (2), the perfluoropolyether block Rf as shown by the following formula (4) in which z=1, and x and y are 0 is particularly preferable because it is excellent in terms of compatibility with nonfluorinated organic compounds.

[Chemical formula 27]

$$—CF_2(OCF_2)_v(OC_2F_4)_wOCF_2— \quad (4)$$

In the formula (4), v and w each represents a number of 0 to 200, preferably of 0 to 50, provided that v+w=3 to 200, preferably 10 to 50; each repeating unit of $(OC_2F_4)$ may be linear or branched, there are no restrictions on an arrangement order of each repeating unit, and the arrangement order may be random or block.

The perfluoropolyether blocks as represented above by the respective formulae have distributions in their structures, and v, w, x and y are average values per molecule. In the formula (1), Q is a divalent organic group having 2 to 12, preferably 3 to 6 carbon atoms. Further, Q in the formula (1) is bonded to any of the terminal carbon atom of Rf, the terminal silicon atom of W1, or the terminal silicon atom of W2. Here, Q may contain an oxygen atom or a nitrogen atom. It specifically may include, for example, an ether bond, an ester bond, an amide bond or a secondary amino group. Specific examples of Q include the groups as listed below.

[Chemical formula 28]

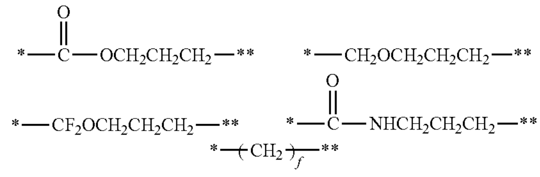

(f is an integer of 2 to 4)

In the formulae, * indicates a free radical that is bonded to Rf and ** indicates a free radical that is bonded to W1 or W2.

Among the specific examples of Q as shown above, $*—CH_2OCH_2CH_2CH_2—**$ is particularly preferred in terms of ease in linking the organopolysiloxane block and the perfluoropolyether block.

It is preferred that the number average molecular weight of the organopolysiloxane of the formula (1) be 3,000 to 500,000. When the number average molecular weight is a number within this range, excellent solubility in nonfluorinated organic compounds will be exhibited, and handling tends to be easy as well. Here, in the present invention, the number average molecular weight is a value in terms of polystyrene that is measured by GPC (gel permeation chromatography) using the following conditions (the same hereinafter).

[Measurement Conditions]

Developing solvent: Toluene

Flow rate: 0.6 mL/min

Detector: Differential refractive index detector (RI)

Column: TSK Guardcolumn Super H—H

TSK gel Super H5000 (6.0 mm I.D.×15 cm×1)

TSK gel Super H4000 (6.0 mm I.D.×15 cm×1)

TSK gel Super H3000 (6.0 mm I.D.×15 cm×1)

TSK gel Super H2000 (6.0 mm I.D.×15 cm×1)

(All manufactured by Tosoh Corporation)

Column temperature: 40 ° C

Sample injection volume: 50 μL (Toluene solution with a concentration of 0.3% by weight)

In the formula (1), g is a number of not smaller than 0, and is preferably a number at which the number average molecular weight of the organopolysiloxane of the formula (1) will be 3,000 to 500,000. Specifically, it is preferred that g be a number of 0 to 50, more preferably a number of 0 to 10.

[Method of Producing Organopolysiloxane]

The present invention also relates to a method for producing the above-mentioned organopolysiloxane having a perfluoropolyether block and a (meth)acryloyl group. The organopolysiloxane of the present invention can be produced by two types of methods as described below.

[Production Method 1]

A component (a), which is a perfluoropolyether-organopolysiloxane block copolymer represented by the following formula (5); a component (b), which is a polysiloxane having a (meth)acryloyl group; and a component (c), which is an acid catalyst, are to be mixed together whereby an exchange reaction between the siloxanes of the components (a) and (b) will take place so as to allow there to be obtained the organopolysiloxane represented by the formula (1).

[Chemical formula 29]

$$W4-Q-Rf-Q-(W3-Q-Rf-Q)_m-W4 \qquad (5)$$

The component (a)—a perfluoropolyether-organopolysiloxane block copolymer represented by the formula (5)—can be produced by, for example, a method described in Japanese Patent No. 4,900,854.

Specifically, hydrosilylated under the presence of a platinum catalyst are: at least one of an organohydrogenpolysiloxane that is used to induce W4 and has one hydrosilyl group at one end thereof and an organohydrogenpolysiloxane that is used to induce W3 and/or W4 and has one hydrosilyl group at both ends thereof; and a compound represented by the following formula (19) wherein an unsaturated group-containing group Q' is present on both sides of Rf. When the organohydrogenpolysiloxane that has one hydrosilyl group at both ends thereof is exclusively hydrosilylated with the compound represented by the formula (19), the unsubstituted or substituted terminal-unsaturated hydrocarbons having 1 to 18 carbon atoms may be further hydrosilylated to deactivate the hydrosilyl groups at the ends. Deactivation of the hydrosilyl groups at the ends can prevent gelatinization in an exchange reaction between the siloxanes.

[Chemical formula 30]

$$Q'\text{-}Rf\text{-}Q' \qquad (19)$$

In the formula (19), Rf is a perfluoropolyether block represented by the formula (2), and Q' is a group that contains an unsaturated group, which is represented by, for example, the following formulae.

[Chemical formula 31]

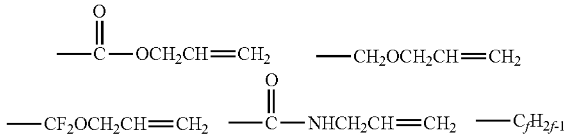

(f is an integer of 2 to 4)

In the formula (5), Rf is a perfluoropolyether block represented by the formula (2), and m is a number greater than or equal to 0.

In the formula (5), each organopolysiloxane block W3 independently represents a divalent group represented by the following formula (A').

[Chemical formula 32]

(A')

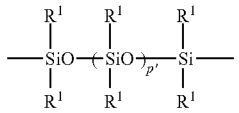

In the formula (A'), each $R^1$ is as defined above. p' is a number of 0 to 1,000, preferably of 0 to 500, more preferably of 0 to 200.

In the formula (5), the organopolysiloxane block W4 is a monovalent group represented by the following formula (B').

[Chemical formula 33]

(B')

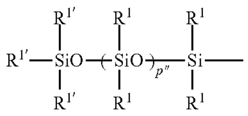

In the formula (B'), $R^1$ and $R^{1'}$ are as defined above. p" is a number of 0 to 1,000, preferably of 0 to 500, more preferably of 0 to 200.

As for the formula (5), the following siloxanes may for example serve as examples of the organohydrogenpolysiloxane that is used to induce W4 and has one hydrosilyl group at one end thereof; the organohydrogenpolysiloxane shall not be limited to those expressed by the following formulae.

[Chemical formula 34]

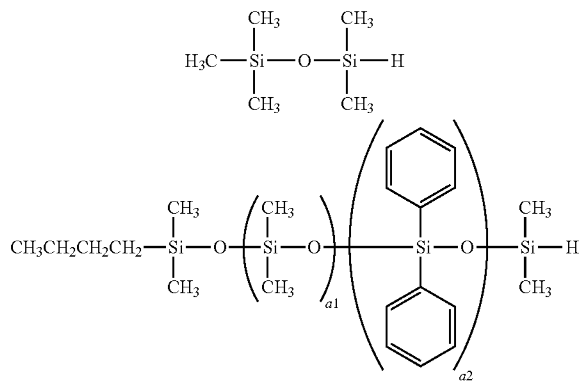

a1 = 0 to 1000
a2 = 0 to 500

(In these formulae, there are no restrictions on the arrangement order of each repeating unit; it may be random or block.)

As for the formula (5), the following siloxanes may for example serve as examples of the organohydrogenpolysiloxane that is used to induce W3 and/or W4 and has one hydrosilyl group at both ends thereof; the organohydrogenpolysiloxane shall not be limited to those expressed by the following formulae.

[Chemical formula 35]

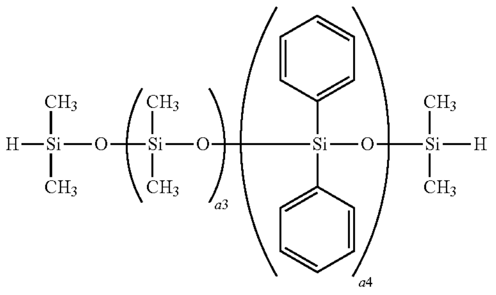

a3 = 0 to 1000
a4 = 0 to 500

(In the formula, there are no restrictions on the arrangement order of each repeating unit; it may be random or block.)

In the formula (5), Q is a divalent organic group having 2 to 12, preferably 3 to 6 carbon atoms. Further, Q in the formula (5) is bonded to any of the terminal carbon atom of Rf, the terminal silicon atom of W3, or the terminal silicon atom of W4. Here, Q may contain an oxygen atom or a nitrogen atom. The Q specifically may be, for example, an ether bond, an ester bond, an amide bond or a secondary amino group. Specific examples of Q include the groups as listed below.

[Chemical formula 36]

-continued

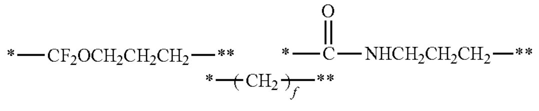

(f is an integer of 2 to 4)

In the formulae, * indicates a free radical that is bonded to Rf and ** indicates a free radical that is bonded to W3 or W4.

Among the specific examples of Q as shown above, $*—CH_2OCH_2CH_2CH_2—**$ is particularly preferred in terms of ease in linking the organopolysiloxane block and the perfluoropolyether block.

The component (b) which is a polysiloxane having a (meth)acryloyl group is a polysiloxane represented by the following formula (6) or (7).

[Chemical formula 37]

(6)

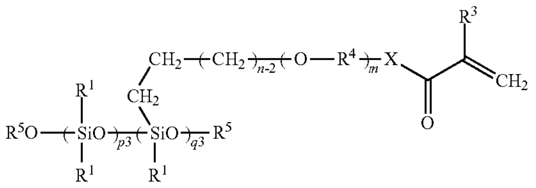

(In the formula (6), $R^1$ and $R^4$ are as defined in the formulae (A) and (3), respectively. $R^5$ independently represents a hydrogen atom, an alkyl group having 1 to 4 carbon atoms or $—SiR^1_3$ (each $R^1$ is as defined above), and preferably is a methyl group or $—Si(CH_3)_3$. $R^3$ is a hydrogen atom or a methyl group. X is an oxygen atom or a group represented by —NH—, preferably an oxygen atom. m is a number of 0 to 60, preferably of 0 to 12. n is a number of 3 to 8, preferably of 3 to 4. $p^3$ is a number of 0 to 1,000, preferably of 0 to 500. q3 is a number of 1 to 100, preferably of 1 to 10.)

[Chemical formula 38]

(7)

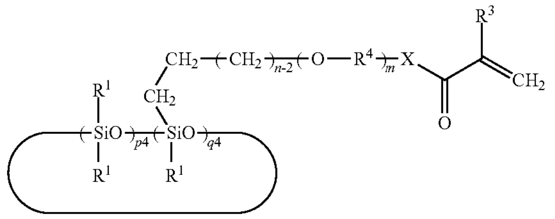

(In the formula (7), $R^1$, $R^3$, $R^4$, X, m and n are as defined in the formula (6). p4 is a number of 0 to 6, preferably of 0; q4 is a number of 1 to 8, preferably of 1 to 5 provided that they satisfy $3 \leq p4+q4 \leq 14$.)

Examples of the polysiloxane represented by the formula (6) include, but are not limited to, for example, the polysiloxanes represented by the following formulae.

[Chemical formula 39]

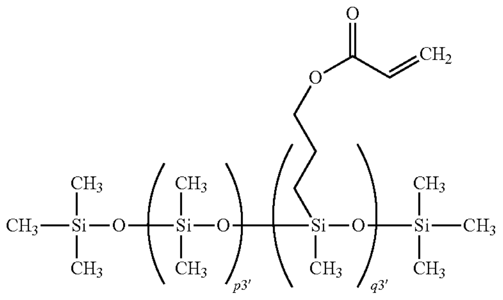

p3′ = 0 to 1000
q3′ = 1 to 1000

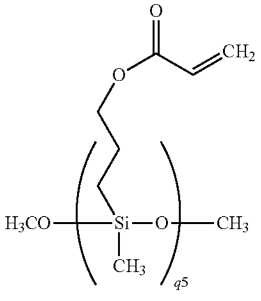

q5 = 1 to 1000

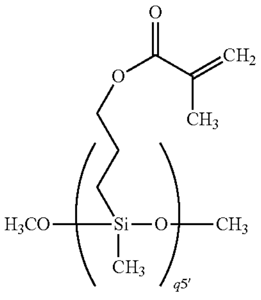

q5′ = 1 to 1000

Examples of the polysiloxane represented by the formula (7) include, but are not limited to, for example, the polysiloxane represented by the following formula.

[Chemical formula 40]

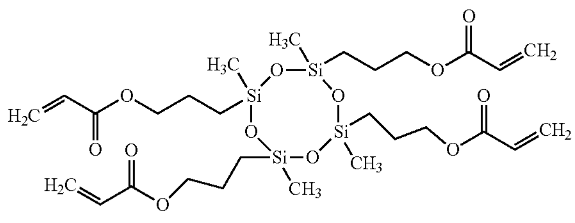

The component (c), which is an acid catalyst to be used in the production method 1, is not particularly limited as long as it is capable of hydrolyzing the siloxane bonds of the components (a) and (b); for example, preferred are sulfuric acid, methanesulfonic acid and trifluoromethanesulfonic acid.

In the method (production method 1) for producing the organopolysiloxane of the formula (1), if necessary, a component (d), which is at least one kind selected from the polysiloxanes represented by the formulae (8) and (9), may be added to perform the exchange reaction between the siloxanes. By adding the component (d) to perform the reaction, the number of organosiloxy units in the formula (1) can be controlled, which makes it easy to control compatibility with nonfluorinated organic compounds.

[Chemical formula 41]

(8)

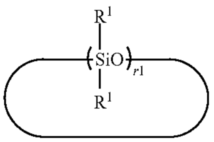

(In the formula (8), each $R^1$ is as defined above. r1 is a number of 3 to 10, preferably of 3 to 8.)

[Chemical formula 42]

(9)

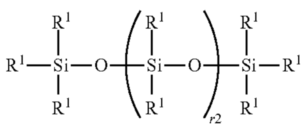

(In the formula (9), each $R^1$ is as defined above. r2 is a number of 0 to 5,000, preferably of 2 to 1,000.)

It is preferred that the component (d) particularly be a cyclic polysiloxane represented by the formula (8) of which particularly preferred are octamethylcyclotetrasiloxane, decamethylcyclopentasiloxane, and dodecamethylcyclohexasiloxane.

In the method (production method 1) for producing the organopolysiloxane of the formula (1) via the exchange reaction between siloxanes, a component (e), which is an organic solvent may optionally be added to perform the exchange reaction between the siloxanes. While such a reaction can also take place without a solvent, by adding an organic solvent, the component (a) which is a perfluoropolyether-organopolysiloxane block copolymer, and the polysiloxanes of the components (b) and (d) will be more compatible with one another such that the exchange reaction between the siloxanes can progress efficiently.

Examples of the component (e) which is an organic solvent may include an aromatic hydrocarbon such as toluene and xylene; an aliphatic hydrocarbon such as pentane, hexane and heptane; ketones such as methylethylketone and diisopropylketone; alcohols such as 1-propanol, 2-propanol and 1-butanol; and a fluorinated aromatic hydrocarbon such as (trifluoromethyl)benzene and 1,3-bis(trifluoromethyl)benzene, of which 1,3-bis(trifluoromethyl)benzene is preferred as it has a favorable compatibility with the component (a) which is a perfluoropolyether-organopolysiloxane block copolymer represented by the formula (5) and with the siloxanes of the components (b) and (d).

In the production method 1, although the reaction temperature is not particularly limited as long as it allows an exchange reaction between the siloxanes of the component (a) which is a perfluoropolyether-organopolysiloxane block copolymer and the siloxanes of the components (b) and (d) to proceed, it is preferred that such temperature be 0 to 60

°C. The reaction temperature not less than the lower limit tends to allow the reaction to proceed quickly while the temperature not greater than the upper limit less likely causes a side reaction. In the production method 1, although the reaction period is not particularly limited as long as it allows the exchange reaction between the siloxanes of the component (a) and the siloxanes of the components (b) and (d) to reach equilibrium, it is preferred that such period be 4 to 24 hours.

The organopolysiloxane of the formula (1) obtained in the production method 1 normally has a distribution in its structure, and the "g" in the formula (1) refers to an average value per molecule.

[Production Method 2]

The organopolysiloxane of the present invention may also be produced by the method as described below.

A component (f), which is an organohydrogenpolysiloxane having a perfluoropolyether block represented by a formula (20) described below, a component (g), which is a compound having a (meth)acryloyl group and a carbon-carbon double bond at the terminal excluding the bond of the (meth)acryloyl group are subjected to a hydrosilylation reaction between the components (f) and (g) under the presence of a component (h) which is a hydrosilylation reaction catalyst so as to allow there to be obtained the organopolysiloxane represented by the formula (1).

[Chemical formula 43]

$$W6—Q—Rf—Q—(W5—Q—Rf—Q)_{g''}—W6 \qquad (20)$$

In the formula (20), each Rf is as defined above, and each organopolysiloxane block W5 independently represents a divalent group represented by the following general formula (A").

[Chemical formula 44]

(A")

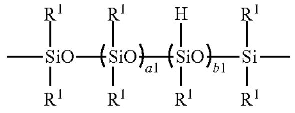

In the formula (A"), each $R^1$ is as defined above. a1 and b1 are each a number of 0 to 1,000, preferably of 0 to 200. The arrangement order of each repeating unit is not limited and may be random or block.

In the formula (20), each organopolysiloxane block W6 independently represents a monovalent group represented by the following formula (B").

[Chemical formula 45]

(B")

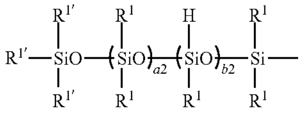

In the formula (B"), $R^1$ and $R^{1'}$ are as defined above. Further, a2 and b2 are each a number of 0 to 1,000, preferably of 0 to 200. The arrangement order of each repeating unit is not limited and may be random or block.

However, the number b1 of the hydrogensiloxane units in the formula (A") and the number b2 of the hydrogensiloxane units in the formula (B") shall not both be 0 at the same time.

In the formula (20), Q is a divalent organic group having 2 to 12 carbon atoms. Further, Q in the formula (20) is bonded to any of the terminal carbon atom of Rf, the terminal silicon atom of W5, or the terminal silicon atom of W6, and g" is a number greater than or equal to 0.

The component (f) which is an organohydrogenpolysiloxane having a perfluoropolyether block represented by the formula (20) may be produced by, for example, a method described in the following.

Specifically, the component (a), which is a perfluoropolyether-organopolysiloxane block copolymer represented by the formula (5); a component (i), which is an organohydrogenpolysiloxane; the component (c), which is an acid catalyst, and, if necessary, the component (d) which is at least one kind selected from the polysiloxanes represented by the formulae (8) and (9) are to be mixed together to perform an exchange reaction between the siloxanes of the components (a) and the siloxanes of the components (i) and (d).

The component (i) which is an organohydrogenpolysiloxane may be either linear, branched or cyclic, and examples of which include the siloxanes as listed below.

[Chemical formula 46]

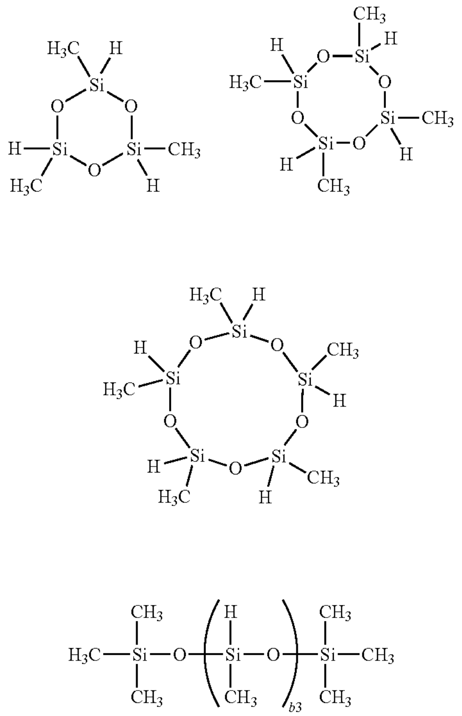

b3 = 1 to 500

Examples of the component (g), which is a compound having a (meth)acryloyl group and a carbon-carbon double bond at the terminal excluding the bond of the (meth) acryloyl group, include a compound represented by a formula (21) as represented below.

[Chemical formula 47]

(21)

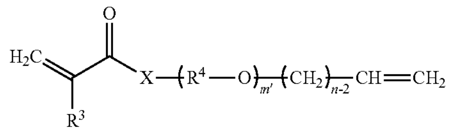

In the formula (21), $R^3$ is a hydrogen atom or a methyl group. X is an oxygen atom or a group represented by —NH—, preferably an oxygen atom. $R^4$ is an alkylene group having 2 to 4 carbon atoms, preferably an alkylene group having 2 or 3 carbon atoms. m' is a number of 0 to 60, preferably of 0 to 12. n is a number of 3 to 8, preferably of 3 to 4.

The component (h) which is a hydrosilylation reaction catalyst may, for example, be a catalyst of platinum, palladium, rhodium, or ruthenium, and preferably is a platinum catalyst. Examples of the platinum catalyst include, for example, platinum chloride, an alcohol or aldehyde solution of platinum chloride, complexes of platinum chloride with various olefins or vinylsiloxanes, and complexes of platinum with various olefins or vinylsiloxanes.

The amount of the component (h) which is a hydrosilylation reaction catalyst used therein may be of a so-called catalyst quantity, which is preferably 0.1 to 200 ppm in terms of metal atomic weight based on the total amount of the components (f) and (g).

In the method (production method 2) of producing an organopolysiloxane of the formula (1) using a hydrosilylation reaction between the components (f) and (g), a component (j) which is an organic solvent may optionally be added thereinto to perform a hydrosilylation reaction. Although this reaction may be performed under the absence of a solvent, it is preferable to add an organic solvent because it allows the component (f), which is an organohydrogenpolysiloxane having a perfluoropolyether block, and the component (g), which is a compound having a (meth)acryloyl group and an unsaturated bond at the terminal excluding the bond of the (meth)acryloyl group to be compatible, and allows the hydrosilylation reaction to effectively proceed.

Examples of the component (j) which is an organic solvent include aromatic hydrocarbons such as toluene and xylene; alcohols such as 1-propanol, 2-propanol and 1-butanol; and fluorinated aromatic hydrocarbons such as (trifluoromethyl)benzene and 1,3-bis(trifluoromethyl)benzene among which preferred is toluene having favorable compatibility with the component (f), which is an organohydrogenpolysiloxane having a perfluoropolyether block represented by the formula (8), and the component (g), which is a compound having a (meth)acryloyl group and an unsaturated bond at the terminal excluding the bond of the (meth)acryloyl group.

It is preferred that the amount to be used therein of the component (j) which is an organic solvent be 10 to 300% by mass of the total amount of the components (f) and (g) although the amount is not particularly limited as long as the components (f) and (g) are compatible.

It is preferred in the production method 2 that the quantitative ratio between the component (f) which is an organohydrogenpolysiloxane having a perfluoropolyether block and the component (g) which is a compound having a (meth)acryloyl group and an unsaturated bond at the terminal excluding the bond of the (meth)acryloyl group be such that the quantitative ratio of the component (g) to the hydrosilyl groups in the component (f) is 1.0 to 2.0 equivalents, more preferably 1.0 to 1.5 equivalents. In the production method 2, although the reaction temperature is not particularly limited as long as it allows the reaction between the components (f) and (g) to proceed, it is preferred that such temperature be 50 to 100 °C. The reaction temperature not less than the lower limit tends to allow the reaction to proceed quickly while the temperature not greater than the upper limit is less likely to cause a polymerization of the (meth)acryloyl group.

WORKING EXAMPLES

The present invention is described in detail hereunder with reference to working and comparative examples; the present invention shall not be limited to the following working examples. Here, in the following examples, the number average molecular weight is a value in terms of polystyrene that is obtained by a GPC measurement performed under the above measurement conditions. Further, in the following examples, the repeating unit number g is a value obtained from $^{29}Si$ NMR spectra and calculated from an integrated value M derived from Si in a structure $Si(R^{1'})_3$-O— based on the formula (1), and an integrated value M' derived from Si in a structure -Q-$Si(R^1)_2$—O— based on the formula (1), where g=(M'/M)−1.

Working Example 1

Synthesis of Organopolysiloxane (1-1)

Here, 6.7 g of perfluoropolyether-organopolysiloxane block copolymer represented by the following formula (5-1) and synthesized according to Japanese Patent No. 4,900,854, 0.86 g of polysiloxane having a methacryloyl group represented by the following formula (6-1), and 7.5 g of 1,3-bis(trifluoromethyl)benzene were put into a reaction container to stir them at 25 °C for 5 min, followed by adding 15 mg of a trifluoromethanesulfonic acid thereinto to then perform stirring at 60 °C for another 7 hours. Next, for the purpose of neutralizing the trifluoromethanesulfonic acid, 100 mg of KYOWAAD 500 (manufactured by Kyowa Chemical Industry Co., Ltd.) as an adsorbent was added, and the mixture was then stirred at 25 °C for another 3 hours. The resultant mixture was then filtrated, followed by distilling away, under reduced pressure, 1,3-bis(trifluoromethyl)benzene as a solvent, thereby obtaining 5.5 g of a liquid product.

[Chemical formula 48]

(5-1)

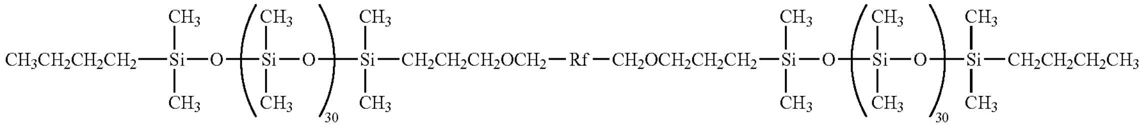

Rf: $-CF_2(OCF_2)_v(OC_2F_4)_wOCF_2-$ (In the formula (5-1), v/w is 0.73 and v+w is 19.)

[Chemical formula 49]

(6-1)

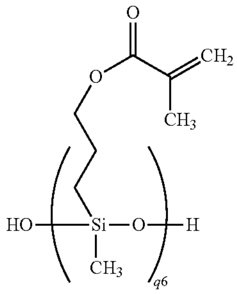

q6 = 2~8

(The structure of the formula (6-1) has a distribution, where q6 is a number of 2 to 8.)

TABLE 1

Chemical shifts in $^{1}$H-NMR spectroscopy of the obtained organopolysiloxane (Measurement device: AVANCE 400 manufactured by Bruker; Solvent: $CDCl_3$)

| Shift (ppm; TMS standard) | | Integration ratio (H) |
|---|---|---|
| −0.39 to 0.30 | $-Si-CH_3$ | 402 |
| 0.43 to 0.62 | $-Si-CH_2-CH_2-$ | 19 |
| 0.88 | $-Si-CH_2-(CH_2)_2-CH_3$ | 6 |
| 1.23 to 1.40 | $-Si-CH_2-(CH_2)_2-CH_3$ | 8 |
| 1.52 to 1.72 | $-Rf-CH_2-O-CH_2-CH_2-$ | 5 |
| 1.64 to 1.80 | $-(C{=}O)-O-CH_2-CH_2-$ | 10 |
| 1.94 | $-(C{=}O)-C(CH_3){=}CH_2$ | 15 |
| 3.42 to 3.62 | $-Rf-CH_2-O-CH_2-CH_2-$ | 5 |
| 3.64 to 3.84 | $-Rf-CH_2-O-CH_2-CH_2-$ | 5 |
| 4.10 | $-(C{=}O)-O-CH_2-CH_2-$ | 10 |
| 5.54 | $-(C{=}O)-C(CH_3){=}CH_2$ | 5 |
| 6.10 | $-(C{=}O)-C(CH_3){=}CH_2$ | 5 |

TABLE 2

Chemical shifts in $^{19}$F-NMR spectroscopy

| Shift (ppm; F11 standard) | | Integration ratio (F) |
|---|---|---|
| −93.0 to 88.3 | $-O-CF_2-CF_2-O-$ | 44 |
| −79.9 | $-CH_2-CF_2-O-$ | 2 |
| −77.9 | $-CH_2-CF_2-O-$ | 2 |
| −57.0 to −51.1 | $-O-CF_2-O-$ | 16 |

TABLE 3

Chemical shifts in $^{29}$Si-NMR spectroscopy

| Shift (ppm; TMS standard) | | Integration ratio (Si) |
|---|---|---|
| −23.9 to −20.9 | $-O-Si(CH_3)_2-O-$ | 65 |
| | $-Si(CH_3)(C_3H_6OCOC(CH_3)CH_2)-$ | |
| 7.4 | $CH_3CH_2CH_2CH_2-Si(CH_3)_2-$ | 2 |
| 7.5 | $-OCH_2CH_2CH_2-Si(CH_3)_2-$ | 2.5 |

The above results indicate that the organopolysiloxane obtained had a structure expressed by the following formula (1-1), and that the organopolysiloxane block content in the molecule was 68%. Further, the number average molecular weight thereof in terms of polystyrene was 4,900 when measured by GPC.

[Chemical formula 50]

$$W2-Q-Rf-Q-(W1-Q-Rf-Q)_g-W2 \quad (1\text{-}1)$$

Rf: $-CF_2(OCF_2)_v(OC_2F_4)_wOCF_2-$ (In the formula, g is 0.25, v/w is 0.73, and v+w is 19.)

W1

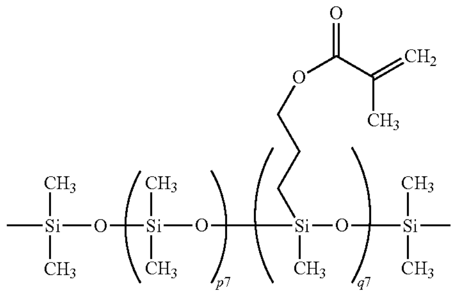

W2

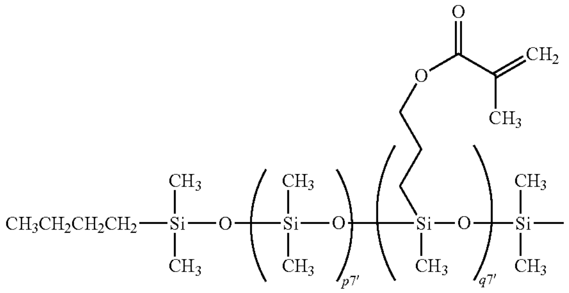

(In the formula, p7, q7, p7' and q7' in W1 and W2 are numbers that are determined such that, in the formula (1-1), the number of siloxane units having a methacryloyl group is 5 and the number of dimethylsiloxy units is 60.)

Q: $-CH_2OCH_2CH_2CH_2-$ (In the formula (1-1), Rf is bonded to the methylene group-side(s) of Q (the same hereinafter).)

Working Example 2

Synthesis of Organopolysiloxane (1-2)

Here, 11.3 g of a perfluoropolyether-organopolysiloxane block copolymer represented by the following formula (5-2), 1.72 g of polysiloxane having a acryloyl group represented by the following formula (6-2), and 11.3 g of 1,3-bis(trifluoromethyl)benzene were put into a reaction container to stir them at 25 °C for 5 min, followed by adding 40 mg of trifluoromethanesulfonic acid thereto, which was then stirred at 55 °C for another 5 hours. Next, for the purpose of neutralizing the trifluoromethanesulfonic acid, 260 mg of KYOWAAD 500 (manufactured by Kyowa Chemical Industry Co., Ltd.) as an adsorbent was added, and the mixture was then stirred at 25 °C for another 3 hours.

The resultant mixture was then filtrated, followed by distilling away, under reduced pressure, 1,3-bis(trifluoromethyl)benzene as a solvent, thereby obtaining 8.8 g of a liquid product.

[Chemical formula 51]

W4-Q-Rf-Q-W4 (5-2)

Rf: $-CF_2(OCF_2)_v(OC_2F_4)_wOCF_2-$ (In the formula, v/w is 0.73, and v+w is 19.)

W4

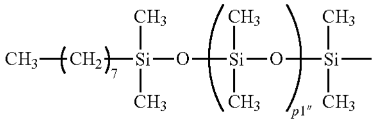

(In the formula (5-2), p" in W4 is a number that is determined such that the number of dimethylsiloxy units is 150.)

Q: $-CH_2OCH_2CH_2CH_2-$ (6-2)

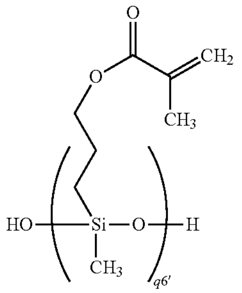

q6' = 2~8

(The structure of the formula (6-2) has a distribution, and q6' is a number of 2 to 8.)

TABLE 4

Chemical shifts in $^1$H-NMR spectroscopy of the obtained organopolysiloxane (Measurement device: AVANCE 400 manufactured by Bruker; Solvent: $CDCl_3$)

| Shift (ppm; TMS standard) | | Integration ratio (H) |
|---|---|---|
| -0.38 to 0.28 | $-Si-CH_3$ | 682 |
| 0.40 to 0.63 | $-Si-CH_2-CH_2-$ | 26 |
| 0.88 | $-Si-CH_2-(CH_2)_6-CH_3$ | 6 |
| 1.16 to 1.38 | $-Si-CH_2-(CH_2)_6-CH_3$ | 24 |
| 1.52 to 1.72 | $-Rf-CH_2-O-CH_2-CH_2-$ | 4 |
| 1.64 to 1.80 | $-(C{=}O)-O-CH_2-CH_2-$ | 16 |
| 3.45 to 3.63 | $-Rf-CH_2-O-CH_2-CH_2-$ | 4 |
| 3.67 to 3.84 | $-Rf-CH_2-O-CH_2-CH_2-$ | 4 |
| 4.11 | $-(C{=}O)-O-CH_2-CH_2-$ | 16 |
| 5.81 | $-(C{=}O)-CH{=}CH_2$ | 8 |
| 6.12 | $-(C{=}O)-CH{=}CH_2$ | 8 |
| 6.39 | $-(C{=}O)-CH{=}CH_2$ | 8 |

TABLE 5

Chemical shifts in $^{19}$F-NMR spectroscopy

| Shift (ppm; F11 standard) | | Integration ratio (F) |
|---|---|---|
| -93.0 to 88.3 | $-O-CF_2-CF_2-O-$ | 44 |
| -79.9 | $-CH_2-CF_2-O-$ | 2 |
| -77.9 | $-CH_2-CF_2-O-$ | 2 |
| -57.0 to -51.1 | $-O-CF_2-O-$ | 16 |

TABLE 6

Chemical shifts in $^{29}$Si-NMR spectroscopy

| Shift (ppm; TMS standard) | | Integration ratio (Si) |
|---|---|---|
| -23.7 to -20.0 | $-O-Si(CH_3)_2-O-$<br>$-Si(CH_3)(C_3H_6OCOCHCH_2)-$ | 114 |
| 7.4 | $CH_3(CH_2)_6CH_2-Si(CH_3)_2-$ | 2 |
| 7.5 | $-OCH_2CH_2CH_2-Si(CH_3)_2-$ | 2 |

The above results indicate that the organopolysiloxane obtained had a structure expressed by the following formula (1-2), and that an organopolysiloxane block content in the molecule was 84%. Further, the number average molecular weight thereof in terms of polystyrene was 7,380 when measured by GPC.

[Chemical formula 52]

W2-Q-Rf-Q-W2 (1-2)

Rf: $-CF_2(OCF_2)_v(OC_2F_4)_wOCF_2-$ (In the formula (1-2), v/w is 0.73, and v+w is 19.)

W2

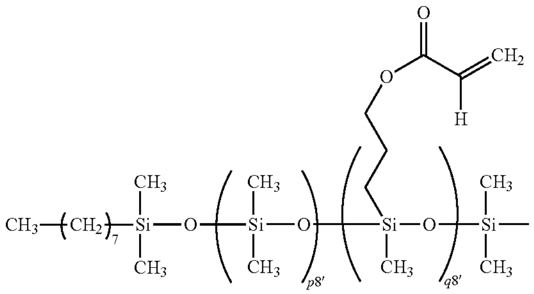

(In the formula, p8' and q8' in W2 are numbers that are determined such that, in the formula (1-2), the number of siloxane units having an acryloyl group is 8 and the number of dimethylsiloxy units is 106.)

Q: $-CH_2OCH_2CH_2CH_2-$

Working Example 3

Synthesis of Organopolysiloxane (1-3)

Here, 0.76 g of 2-allyloxyethyl methacrylate and 0.76 g of toluene were put into a reaction container to stir them at 80 °C for 5 min, followed by adding 0.01 g toluene solution of vinylsiloxane complex of platinum. Next, a mixed solution of 3.8 g of organohydrogenpolysiloxane having a perfluoropolyether block represented by the following formula (20-1) and 3.8 g of toluene was added by drops at 80 °C for 1 hour, and then stirred at 80 °C for another 1.5 hours. The toluene as a solvent was then distilled away under reduced pressure to thereby obtain 4.3 g of a liquid product.

[Chemical formula 53]

W6-Q-Rf-Q-W6 (20-1)

Rf: $-CF_2(OCF_2)_v(OC_2F_4)_wOCF_2-$ (In the formula, v/w is 0.73, and v+w is 19.)

W6

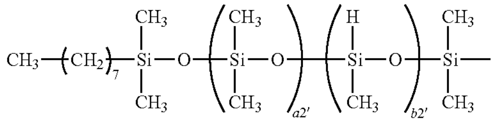

(In the formula, a2' and b2' in W6 are numbers that are determined such that, in the formula (20-1), the number of organohydrogensiloxy units is 7 and the number of dimethylsiloxy units is 42.)

Q: $-CH_2OCH_2CH_2CH_2-$

TABLE 7

Chemical shifts in $^1$H-NMR spectroscopy of the obtained organopolysiloxane (Measurement device: AVANCE 400 manufactured by Bruker; Solvent: $CDCl_3$)

| Shift (ppm; TMS standard) | | Integration ratio (H) |
|---|---|---|
| −0.28 to 0.28 | $-Si-CH_3$ | 297 |
| 0.40 to 0.59 | $-Si-CH_2-CH_2-$ | 22 |
| 0.88 | $-Si-CH_2-(CH_2)_6-CH_3$ | 6 |
| 1.19 to 1.37 | $-Si-CH_2-(CH_2)_6-CH_3$ | 24 |
| 1.49 to 1.63 | $-(C{=}O)-O-(CH_2)_2-O-CH_2-CH_2-$ | 14 |
| 1.55 to 1.70 | $-Rf-CH_2-O-CH_2-CH_2-$ | 4 |
| 1.94 | $-(C{=}O)-C(CH_3){=}CH_2$ | 21 |
| 3.42 | $-(C{=}O)-O-(CH_2)_2-O-CH_2-CH_2-$ | 14 |
| 3.47 to 3.58 | $-Rf-CH_2-O-CH_2-CH_2-$ | 4 |
| 3.53 to 3.62 | $-Rf-CH_2-O-CH_2-CH_2-$ | 4 |
| 3.65 to 3.71 | $-(C{=}O)-O-CH_2-CH_2-O-$ | 14 |
| 4.23 to 4.33 | $-(C{=}O)-O-CH_2-CH_2-O-$ | 14 |
| 5.56 | $-(C{=}O)-C(CH_3){=}CH_2$ | 7 |
| 6.13 | $-(C{=}O)-C(CH_3){=}CH_2$ | 7 |

TABLE 8

Chemical shifts in $^{19}$F-NMR spectroscopy

| Shift (ppm; F11 standard) | | Integration ratio (F) |
|---|---|---|
| −93.0 to 88.3 | $-O-CF_2-CF_2-O-$ | 44 |
| −79.9 | $-CH_2-CF_2-O-$ | 2 |
| −77.9 | $-CH_2-CF_2-O-$ | 2 |
| −57.0 to −51.1 | $-O-CF_2-O-$ | 16 |

TABLE 9

| Chemical shifts in $^{29}$Si-NMR spectroscopy | | |
|---|---|---|
| Shift (ppm; TMS standard) | | Integration ratio (Si) |
| −23.7 to −20.0 | $—O—Si(CH_3)_2—O—$<br>$—Si(CH_3)(C_3H_6OC_2H_4OCOC(CH_3)CH_2)—$ | 49 |
| 7.4 | $CH_3(CH_2)_6CH_2—Si(CH_3)_2—$ | 2 |
| 7.5 | $—OCH_2CH_2CH_2—Si(CH_3)_2—$ | 2 |

The above results indicate that the organopolysiloxane obtained had a structure expressed by the following formula (1-3), and that an organopolysiloxane block content in the molecule was 75%. Further, the number average molecular weight thereof in terms of polystyrene was 6,350 when measured by GPC.

[Chemical formula 54]

$$W2\text{-}Q\text{-}Rf\text{-}Q\text{-}W2 \qquad (1\text{-}3)$$

Rf: $—CF_2(OCF_2)_v(OC_2F_4)_wOCF_2—$ (In the formula, v/w is 0.73, and v+w is 19.)

W2

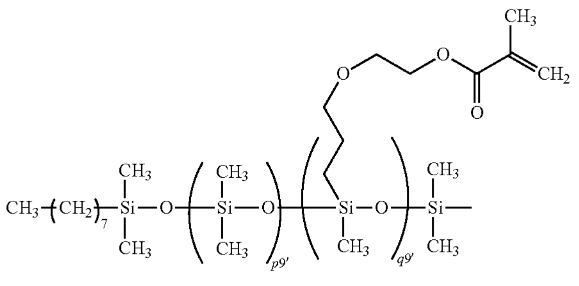

(In the formula, p9' and q9' in W2 are numbers that are determined such that, in the formula (1-3), the number of siloxane units having a methacryloyl group is 7 and the number of dimethylsiloxy units is 42.)

Q: $—CH_2OCH_2CH_2CH_2—$

Working Example 4

Synthesis of Organopolysiloxane (1-4)

Here, 4.1 g of organohydrogenpolysiloxane having a perfluoropolyether-organopolysiloxane block represented by the following formula (20-2), 0.23 g of 2-allyloxyethyl methacrylate were put into a reaction container to stir them at 80 °C for 5 min, followed by adding 0.01 g of toluene solution of vinylsiloxane complex of platinum. The mixture was stirred for 2 hours at 80 °C and then distilled away under reduced pressure to obtain 4.2 g of a liquid product.

[Chemical formula 55]

$$W6—Q—Rf—Q—(W5—Q—Rf—Q)_{g''}—W6 \qquad (20\text{-}2)$$

Rf: $—CF_2(OCF_2)_v(OC_2F_4)_wOCF_2—$ (In the formula, g" is 0.25, v/w is 0.73, and v+w is 19.)

W5

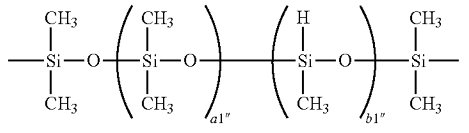

W6

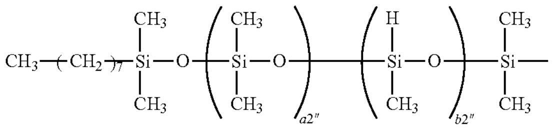

(In the formula, a1", b1", a2" and b2" in W5 and W6 are numbers that are determined such that, in the formula (20-2), the number of organohydrogensiloxy units is 3 and the number of dimethylsiloxy units is 135.)

Q: $—CH_2OCH_2CH_2CH_2—$

TABLE 10

| Chemical shifts in $^1$H-NMR spectroscopy of the obtained organopolysiloxane (Measurement device: AVANCE 400 manufactured by Bruker; Solvent: $CDCl_3$) | | |
|---|---|---|
| Shift (ppm; TMS standard) | | Integration ratio (H) |
| −0.28 to 0.28 | $—Si—CH_3$ | 846 |
| 0.40 to 0.59 | $—Si—CH_2—CH_2—$ | 15 |
| 0.88 | $—Si—CH_2—(CH_2)_6—CH_3$ | 6 |
| 1.19 to 1.37 | $—Si—CH_2—(CH_2)_6—CH_3$ | 24 |
| 1.49 to 1.63 | $—(C{=}O)—O—(CH_2)_2—O—CH_2—CH_2—$ | 6 |
| 1.55 to 1.70 | $—Rf—CH_2—O—CH_2—CH_2—$ | 5 |
| 1.94 | $—(C{=}O)—C(CH_3){=}CH_2$ | 9 |
| 3.42 | $—(C{=}O)—O—(CH_2)_2—O—CH_2—CH_2—$ | 6 |
| 3.47 to 3.58 | $—Rf—CH_2—O—CH_2—CH_2—$ | 5 |

TABLE 10-continued

| Chemical shifts in $^1$H-NMR spectroscopy of the obtained organopolysiloxane (Measurement device: AVANCE 400 manufactured by Bruker; Solvent: $CDCl_3$) | | |
|---|---|---|
| Shift (ppm; TMS standard) | | Integration ratio (H) |
| 3.53 to 3.62 | $—Rf—CH_2—O—CH_2—CH_2—$ | 5 |
| 3.65 to 3.71 | $—(C{=}O)—O—CH_2—CH_2—O—$ | 6 |
| 4.23 to 4.33 | $—(C{=}O)—O—CH_2—CH_2—O—$ | 6 |
| 5.56 | $—(C{=}O)—C(CH_3){=}CH_2$ | 3 |
| 6.13 | $—(C{=}O)—C(CH_3){=}CH_2$ | 3 |

TABLE 11

| Chemical shifts in $^{19}$F-NMR spectroscopy | | |
|---|---|---|
| Shift (ppm; F11 standard) | | Integration ratio (F) |
| -93.0 to 88.3 | $—O—CF_2—CF_2—O—$ | 44 |
| -79.9 | $—CH_2—CF_2—O—$ | 2 |
| -77.9 | $—CH_2—CF_2—O—$ | 2 |
| -57.0 to -51.1 | $—O—CF_2—O—$ | 16 |

TABLE 12

| Chemical shifts in $^{29}$Si-NMR spectroscopy | | |
|---|---|---|
| Shift (ppm; TMS standard) | | Integration ratio (Si) |
| -23.7 to -20.0 | $—O—Si(CH_3)_2—O—$<br>$—Si(CH_3)(C_3H_6OC_2H_4OCOC(CH_3)CH_2)—$ | 138 |
| 7.4 | $CH_3(CH_2)_6CH_2—Si(CH_3)_2—$ | 2 |
| 7.5 | $—OCH_2CH_2CH_2—Si(CH_3)_2—$ | 2 |

The above results indicate that the organopolysiloxane obtained had a structure expressed by the following formula (1-4), and that an organopolysiloxane block content in the molecule was 87%. Further, the number average molecular weight thereof in terms of polystyrene was 11,500 when measured by GPC.

[Chemical formula 56]

$$W2—Q—Rf—Q\left(W1—Q—Rf—Q\right)_g W2 \quad (1\text{-}4)$$

Rf: $—CF_2(OCF_2)_v(OC_2F_4)_wOCF_2—$ (In the formula, g is 0.25, v/w is 0.73, and v+w is 19.)

W1

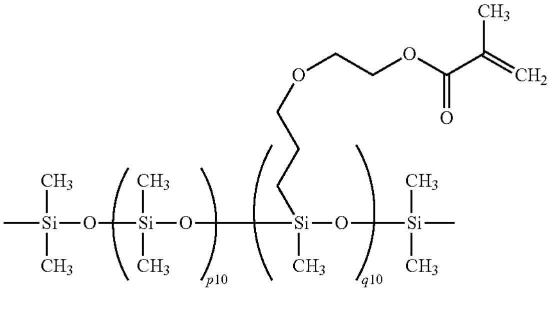

-continued

W2

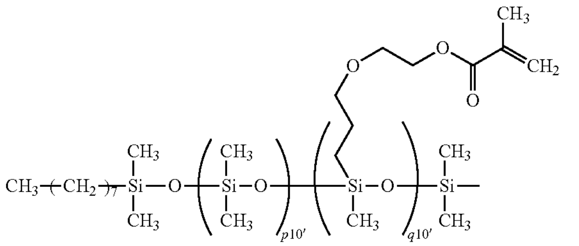

(In the formula, p10, q10, p10' and q10' in W1 and W2 are numbers that are determined such that, in the formula (1-4), the number of siloxane units having a methacryloyl group is 3 and the number of dimethylsiloxy units is 135.)

Q: $—CH_2OCH_2CH_2CH_2—$

Comparative Example 1

(Organopolysiloxane Block Content in Molecule: 0%)

15.5 g of 2-isocyanatoethyl methacrylate and 0.005 g of dioctyltin laurate were put into a reaction container under the presence of dried air, and the mixture was stirred at 25 °C for 5 minutes followed by adding, by drops, 100 g of perfluoropolyether diol (Trade name: Fomblin D2 manufactured by Solvay Specialty Polymers) for 1 hour at 50 °C.

After the addition by drops was over, it was stirred for 5 hours at 50 °C. A peak appearing at 2,300 $cm^{-1}$, originating from the —N═C═O group, had disappeared from the IR spectrum, and a perfluoropolyether having a methacryl group at both ends was obtained.

Comparative Example 2

(Organopolysiloxane Block Content in Molecule: 24%)

Here, 0.68 g of 2-allyloxyethyl methacrylate and 0.68 g of 1,3-bis(trifluoromethyl)benzene were put into a reaction container to stir them at 80 °C for 5 min, followed by adding 0.01 g of toluene solution of vinylsiloxane complex of platinum. Next, a mixed solution of 4.0 g of organohydrogenpolysiloxane having a perfluoropolyether block represented by the following formula (22) and 4.0 g of 1,3-bis(trifluoromethyl)benzene was added by drops at 80 °C for 1 hour, and then it was stirred at 80 °C for another 1.5 hours. The 1,3-bis(trifluoromethyl)benzene as a solvent was then distilled away under reduced pressure to thereby obtain 4.4 g of organopolysiloxane which is represented by the following formula (23).

[Chemical Formula 57]

(22)

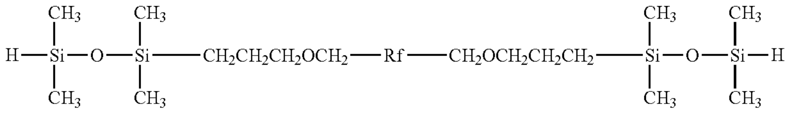

Rf: $—CF_2(OCF_2)_v(OC_2F_4)_wOCF_2—$ (In the formula, v/w is 0.73, and v+w is 19.)

[Chemical Formula 58]

(23)

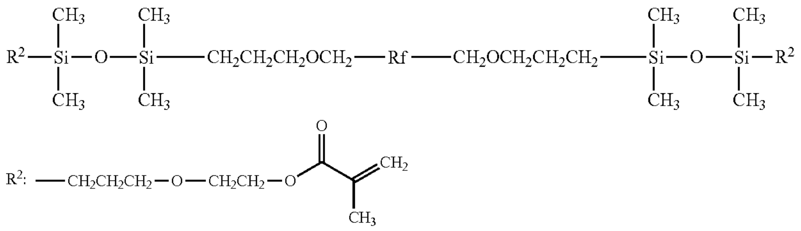

(In the formulae, Rf is as defined above.)

[Evaluation on Solubility into Nonfluorinated Organic Compounds]

Here, 1 g of organopolysiloxane in each of the working and comparative examples as indicated above was mixed into 9 g of the following nonfluorinated organic compounds, and the mixed liquids were visually observed to evaluate their solubility based on the following criteria.

Evaluation criteria:

○: Mixed liquid was transparent.

x: Mixed liquid was separated into two phases or had white turbidity.

TABLE 13

| | Working example 1 | Working example 2 | Working example 3 | Working example 4 | Comparative example 1 | Comparative example 2 |
|---|---|---|---|---|---|---|
| Hexane | ○ | ○ | ○ | ○ | X | X |
| Toluene | ○ | ○ | ○ | ○ | X | X |
| THF | ○ | ○ | ○ | ○ | X | X |
| IPA | ○ | ○ | ○ | ○ | X | X |
| Ethyl acetate | ○ | ○ | ○ | ○ | X | X |
| Acetone | ○ | ○ | ○ | ○ | X | X |
| Methyl methacrylate | ○ | ○ | ○ | ○ | X | X |

TABLE 13-continued

| | Working example 1 | Working example 2 | Working example 3 | Working example 4 | Comparative example 1 | Comparative example 2 |
|---|---|---|---|---|---|---|
| Butyl acrylate | ○ | ○ | ○ | ○ | X | X |

The results shown in Table 13 indicates that the organopolysiloxane of the present invention having a perfluoropolyether block and a (meth)acryloyl group has more excellent solubility into nonfluorinated organic compounds, as compared to a conventional organopolysiloxane with lesser siloxane content.

Further, since the organopolysiloxane of the present invention having a perfluoropolyether block and a (meth) acryloyl group allows the number of organosiloxy units and the number of siloxane units having (meth)acryloyl groups to be easily controlled, compatibility thereof and/or mechanical properties of the cured product can also be easily controlled. Accordingly, the organopolysiloxane of the present invention is useful as a formulation into, for example, a resin composition.

The invention claimed is:

1. An organopolysiloxane comprising a perfluoropolyether block and a (meth)acryloyl group, said organopolysiloxane being represented by the following formula (1)

[Chemical formula 1]

$$W2—Q—Rf—Q—(W1—Q—Rf—Q)_g—W2 \quad (1)$$

wherein in the formula (1), Rf is a perfluoropolyether block represented by a formula (2) as defined below, W1 is a divalent organopolysiloxane block represented by a formula (A) as defined below, each W2 independently represents a monovalent organopolysiloxane block represented by a formula (B) as defined below, Q is a divalent organic group having 2 to 12 carbon atoms and g is a number of not smaller than 0, wherein the formula (2) is expressed as

[Chemical formula 2]

$$—C_zF_{2z}(OCF_2)_v(OC_2F_4)_w(OC_3F_6)_x(OC_4F_8)_yOC_zF_{2z}— \quad (2)$$

wherein in the formula (2), z is a number of 1 to 4; v, w, x and y each independently represents a number of 0 to 200 where v+w+x+y=3 to 200, each repeating unit may be linear or branched, there are no restrictions on an arrangement order of each repeating unit, and the arrangement order may be random or block, wherein the formula (A) is expressed as

[Chemical Formula 3]

(A)

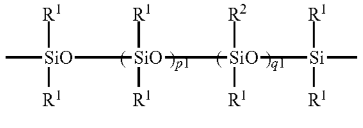

wherein in the formula (A), $R^1$ independently represents a group selected from an alkyl group having 1 to 18 carbon atoms, an aryl group having 6 to 18 carbon atoms and an aralkyl group having 7 to 18 carbon atoms, $R^2$ is a monovalent group having a (meth)acryloyl group, p1 and q1 each represents a number of 0 to 1,000, there are no restrictions on an arrangement order of each repeating unit, and the arrangement order may be random or block, and wherein the formula (B) is expressed as

[Chemical Formula 4]

(B)

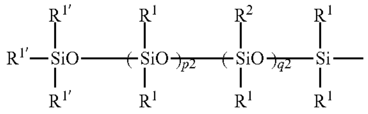

wherein in the formula (B), $R^1$ independently represents a group selected from an alkyl group having 1 to 18 carbon atoms, an aryl group having 6 to 18 carbon atoms and an aralkyl group having 7 to 18 carbon atoms, $R^2$ is a monovalent group having a (meth)acryloyl group, $R^{1'}$ independently represents a group selected from an alkyl group having 1 to 18 carbon atoms, an aryl group having 6 to 18 carbon atoms and an aralkyl group having 7 to 18 carbon atoms, p2 and q2 each represents a number of 0 to 1,000, there are no restrictions on an arrangement order of each repeating unit, and the arrangement order may be random or block, and wherein the number q1 of the siloxane units having a (meth)acryloyl group in the formula (A) and the number q2 of the siloxane units having a (meth)acryloyl group in the formula (B) shall not both be 0 at the same time; and Q in the formula (1) is bonded to any of the terminal carbon atom of Rf, the terminal silicon atom of W1, or the terminal silicon atom of W2.

2. The organopolysiloxane comprising a perfluoropolyether block and a (meth)acryloyl group according to claim 1, wherein the organopolysiloxane has a number average molecular weight of 3,000 to 500,000, and an organopolysiloxane block content of not smaller than 50% per molecule.

3. The organopolysiloxane comprising a perfluoropolyether block and a (meth)acryloyl group according to claim 1, wherein the monovalent group represented by $R^2$ having a (meth)acryloyl group is a group expressed by the following formula (3)

[Chemical formula 5]

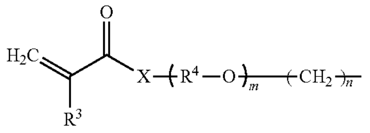

(3)

wherein in the formula (3), $R^3$ is a hydrogen atom or a methyl group, X is an oxygen atom or a group represented by —NH—, $R^4$ is an alkylene group having 2 to 4 carbon atoms, m is a number of 0 to 60, and n is a number of 3 to 8.

4. The organopolysiloxane comprising a perfluoropolyether block and a (meth)acryloyl group according to claim 1, wherein the perfluoropolyether block represented by Rf is a group expressed by the following formula (4)

[Chemical formula 6]

$$—CF_2(OCF_2)_v(OC_2F_4)_wOCF_2— \quad (4)$$

wherein in the formula (4), v and w each represent a number of 0 to 200, provided that v+w=3 to 200; the repeating unit of $(OC_2F_4)$ may be linear or branched, there are no restrictions on an arrangement order of each repeating unit, and the arrangement order may be random or block.

5. A method for producing an organopolysiloxane, represented by a formula (1) as defined below, having a perfluoropolyether block and a (meth)acryloyl group, comprising the steps of:

mixing the components of (a) a perfluoropolyether-organopolysiloxane block copolymer represented by a formula (5) as defined below and (b) a polysiloxane having a (meth)acryloyl group; and performing an exchange reaction between the siloxanes of the components (a) and (b) under the presence of (c) an acid catalyst, wherein the formula (1) is expressed as

[Chemical formula 1]

$$W2—Q—Rf—Q—(W1—Q—Rf—Q)_g—W2 \quad (1)$$

wherein in the formula (1), Rf is a perfluoropolyether block represented by a formula (2) as defined below, W1 independently represents a divalent organopolysiloxane block represented by a formula (A) as defined below, each W2 independently represents a monovalent organopolysiloxane block represented by a formula (B) as defined below, Q is a divalent organic group having 2 to 12 carbon atoms and g is a number of not smaller than 0, wherein the formula (2) is expressed as

[Chemical formula 8]

$$—C_zF_{2z}(OCF_2)_v(OC_2F_4)_w(OC_3F_6)_x(OC_4F_8)_yOC_zF_{2z}— \quad (2)$$

wherein in the formula (2), z is a number of 1 to 4, v, w, x and y each independently represents a number of 0 to 200 where v+w+x+y=3 to 200, each repeating unit may be linear or branched, there are no restrictions on an arrangement order of each repeating unit, and the arrangement order may be random or block, wherein the formula (A) is expressed as

[Chemical Formula 9]

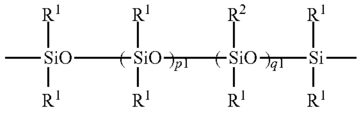

(A)

wherein in the formula (A), $R^1$ independently represents a group selected from an alkyl group having 1 to 18 carbon atoms, an aryl group having 6 to 18 carbon atoms and an aralkyl group having 7 to 18 carbon atoms, $R^2$ independently represents a monovalent group having a (meth)acryloyl group, p1 and q1 each represents a number of 0 to 1,000, there are no restrictions on an arrangement order of each repeating unit, and the arrangement order may be random or block, and wherein the formula (B) is expressed as

[Chemical Formula 10]

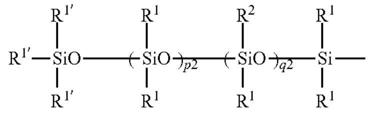

(B)

wherein in the formula (B), $R^1$ independently represents a group selected from an alkyl group having 1 to 18 carbon atoms, an aryl group having 6 to 18 carbon atoms and an aralkyl group having 7 to 18 carbon atoms, $R^2$ is a monovalent group having a (meth)acryloyl group, $R^{1'}$ independently represents a group selected from an alkyl group having 1 to 18 carbon atoms, an aryl group having 6 to 18 carbon atoms and an aralkyl group having 7 to 18 carbon atoms, p2 and q2 each represents a number of 0 to 1,000, there are no restrictions on an arrangement order of each repeating unit, and the arrangement order may be random or block, and wherein the number q1 of the siloxane units having a (meth)acryloyl group in the formula (A) and the number q2 of the siloxane units having a (meth)acryloyl group in the formula (B) shall not both be 0 at the same time, and Q in the formula (1) is bonded to any of the terminal carbon atom of Rf, the terminal silicon atom of W1, or the terminal silicon atom of W2; and

[Chemical formula 11]

$$W4—Q—Rf—Q—(W3—Q—Rf—Q)_{g'}—W4 \quad (5)$$

wherein in the formula (5), Rf is a perfluoropolyether block represented by the formula (2), each W3 independently represents a divalent organopolysiloxane block represented by a formula (A') as defined below, each W4 independently represents a monovalent organopolysiloxane block represented by a formula (B') as defined below, Q is as defined above and g' is a number of not smaller than 0 wherein the formula (A') is expressed as

[Chemical Formula 12]

(A')

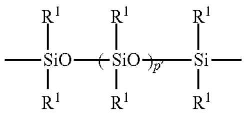

wherein in the formula (A'), each $R^1$ is as defined above, p' represents a number of 0 to 1,000, and the formula (B') being expressed as

[Chemical Formula 13]

(B')

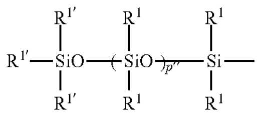

wherein in the formula (B'), $R^1$ and $R^{1'}$ are as defined above, and p" is a number of 0 to 1,000, and wherein Q in the formula (5) is bonded to any of the terminal carbon atom of Rf, the terminal silicon atom of W3, or the terminal silicon atom of W4.

6. The method for producing an organopolysiloxane having a perfluoropolyether block and a (meth)acryloyl group according to claim 5, wherein the component (b) comprises at least one kind of polysiloxane having a (meth)acryloyl group represented by the following formula (6) or (7) expressed as:

[Chemical formula 14]

(6)

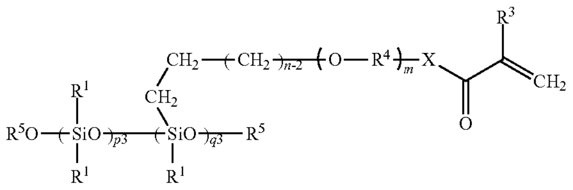

wherein in the formula (6), $R^1$ independently represents a group selected from an alkyl group having 1 to 18 carbon atoms, an aryl group having 6 to 18 carbon atoms and an aralkyl group having 7 to 18 carbon atoms, $R^5$ independently represents a hydrogen atom, an alkyl group having 1 to 4 carbon atoms or $—SiR^1_3$ (each $R^1$ is as defined above), $R^3$ is a hydrogen atom or a methyl group, X is an oxygen atom or a group represented by —NH—, $R^4$ is an alkylene group having 2 to 4 carbon atoms, m is a number of 0 to 60, n is a number of 3 to 8, p3 is a number of 0 to 1,000, and q3 is a number of 1 to 100; and

[Chemical formula 15]

(7)

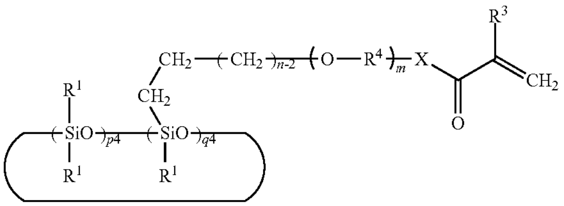

wherein in the formula (7), $R^1$, $R^3$, $R^4$, X, m and n are as defined above, p4 is a number of 0 to 6, and q4 is a number of 1 to 8 provided that they satisfy $3 \leq p4+q4 \leq 14$.

7. The method for producing an organopolysiloxane having a perfluoropolyether block and a (meth)acryloyl group according to claim 5, further comprising a step of adding a component (d) which comprises at least one kind selected from the polysiloxanes represented by formulae (8) and (9) expressed as:

[Chemical formula 16]

(8)

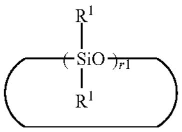

wherein in the formula (8), $R^1$ independently represents a group selected from an alkyl group having 1 to 18 carbon atoms, an aryl group having 6 to 18 carbon atoms and an aralkyl group having 7 to 18 carbon atoms, and r1 is a number of 3 to 10; and

[Chemical formula 17]

(9)

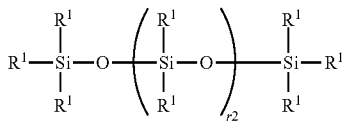

wherein in the formula (9), each $R^1$ is as defined above, and r2 is a number of 0 to 5,000.

8. The method for producing an organopolysiloxane having a perfluoropolyether block and a (meth)acryloyl group according to claim 5, wherein the component (c) as being the acid catalyst comprises at least one kind selected from the group consisting of sulfuric acid, methanesulfonic acid and trifluoromethanesulfonic acid.

9. The method for producing an organopolysiloxane having a perfluoropolyether block and a (meth)acryloyl group according to claim 5, wherein the step of performing an exchange reaction between the siloxanes of the components (a) and (b) is carried out under the presence of a component (e) as being an organic solvent.

* * * * *